United States Patent [19]
Christie

[11] 3,937,245
[45] Feb. 10, 1976

[54] METHOD AND APPARATUS FOR CONNECTING A RIGHT ANGLE SERVICE LINE TO A MAIN

[76] Inventor: Joe William Christie, Box 386, Frisco, Tex. 75034

[22] Filed: May 13, 1974

[21] Appl. No.: 469,529

[52] U.S. Cl. .............................. 137/318; 285/197
[51] Int. Cl.² .......................................... F14L 41/04
[58] Field of Search ............ 137/318, 317; 285/197, 285/198, 199

[56] References Cited
UNITED STATES PATENTS

| | | | |
|---|---|---|---|
| 1,701,786 | 2/1929 | McMurray | 137/318 |
| 3,302,493 | 2/1967 | Hulslander | 137/318 X |
| 3,692,044 | 9/1972 | Wise | 137/318 |
| 3,817,271 | 6/1974 | Roven | 137/318 |

Primary Examiner—Alan Cohan
Attorney, Agent, or Firm—Richards, Harris and Medlock

[57] ABSTRACT

Disclosed is an apparatus for connecting a service line at a right angle to a main, having a fitting with one end shaped to be fixed to the exterior surface of the main in a plane with the fitting extending horizontally from the main. First and second through bores are formed in the fitting. These bores are axially spaced and positioned in the fitting to radially extend from the main when the fitting is fixed thereto. A port adjacent the end of the fitting shaped for connection to the exterior of the main interconnects the two through bores. Means is provided in the first through bore for connecting a service line to the fitting to extend radially from the center of the main. Internal threads are formed in the second through bore for receiving an externally-threaded tapping means for manipulation axially through the bore to cut a coupon from the wall of the main to interconnect the main with the first through bore. A sealing plug is provided for sealing the open end of the second through bore.

12 Claims, 10 Drawing Figures

METHOD AND APPARATUS FOR CONNECTING A RIGHT ANGLE SERVICE LINE TO A MAIN

BACKGROUND OF THE INVENTION

The present invention relates to improvements in apparatus for connecting a service line at a right angle to a buried main.

In the provision of utility services to residential areas, and the like, it has been common to use conduits for gas mains formed from polyethylene, and the like. These gas mains are normally installed parallel to and under the center of a road or alley. The individual connections to the main by residences, and the like extend horizontally from and a right angle to the main. Since these mains carry natural gas, their installation specifications are prescribed by various governmental agencies. For example, the United States Department of Transportation prescribes specifications such as the depth at which the gas mains must be buried in the earth.

In many situations, this depth is very important. For example, in some areas, an increase in depth can involve a substantial increase in installation costs. This can be due to the existence of a layer of rock. Also due to the fact that these gas mains extend for miles in many cases, the increased cost due to increases in depth can be substantial. Therefore, in some areas, it is of primary importance to maintain the depth of the main at a minimum while complying with the specifications set by the various government agencies.

In the provision of service connections to a main in environments such as residential developments, it is desirable and quite common to use a fitting to form a right angle connection to the main. Many of these fittings can be installed while gas is present in the main and without disturbing service of customers already connected to the main. These fittings typically have means for attaching to the exterior of the main and means for forming a port in the wall of the main. Typical prior art arrangements for making a right angle service line connection are disclosed in the following U.S. Patents:

| Patent No. | Patentee | Issue Date |
|---|---|---|
| RE26,447 | McMurray et al | Aug. 27, 1968 |
| 936,618 | Ford | Oct. 12, 1909 |
| 3,045,512 | Risley et al | Jul. 24, 1962 |
| 3,094,137 | Burke | Jun. 18, 1963 |
| 3,252,475 | Jones | May 24, 1966 |
| 3,307,435 | Floren | Mar. 7, 1967 |
| 3,342,088 | Smith | Sept. 19, 1967 |
| 3,411,527 | Nielsen | Nov. 19, 1968 |
| 3,460,553 | Leopold et al | Aug. 12, 1969 |
| 3,554,217 | Ehrens | Jan 12, 1971 |
| 3,561,298 | Graffenreid et al | Feb. 9, 1971 |
| 3,620,245 | Finney | Oct. 21, 1969 |
| 3,756,261 | Minchhoff | Nov. 16, 1971 |

Typical prior art arrangements for making parallel-extending service line connections are disclosed in the following Patents:

| Patent No. | Patentee | Issue Date |
|---|---|---|
| 3,131,712 | Risley et al | May 5, 1964 |
| 3,142,205 | Hulslander | July 28, 1964 |
| 3,302,493 | Hulslander et al | February 7, 1967 |
| 3,580,269 | Ehrens et al | May 25, 1971 |

Although the above-mentioned prior art devices can be used to attach a service line to a main, they are not entirely satisfactory under all conditions or service. For example, many specifications for installing gas lines not only require that the gas main be buried below a set minimum depth, but also require that all service lines and their fittings be located below this minimum depth. Thus, the use of any fittings which extend above the main or connect service lines at a position extending above the main will cause the main to be buried deeper than the set minimum. In many cases, this requires that the entire length of the main be buried deeper by the height of the vertical extension of the fitting.

Therefore, according to the present invention, an improved apparatus for attaching a service line at a right angle with respect to a gas main is provided which does not extend vertically above the main when installed and which requires a minimal amount of installation space in an access trench perpendicular to the gas main.

More specifically, according to the present invention, an apparatus for connection to a gas main is provided comprising a fitting with one end shaped to be fixed to the exterior wall of a gas main. The fitting has first and second through bores extending transverse to the length of the gas main. The bores are positioned to be axially spaced along the length of the gas main and radially extending therefrom when the fitting is fixed to the main. The first through bore is provided with means for connecting a service line. The second through bore is connected to the first by a port. The second through bore is provided with internal threads for engaging an externally-threaded tapping means. The tapping means has a cutting head at one end and is axially manipulated in the bore to remove a coupon from the wall of the main to connect the gas main to the service line. The tapping means can be backed off and a plug placed in the end of the second bore to seal the same.

The advantages and features of the present invention will be readily appreciated by those of ordinary skill in the art as the same becomes better appreciated by the following description when considered in connection with the accompanying Drawings, in which.

DESCRIPTION OF THE PREFERRED EMBODIMENT

Figure 1:
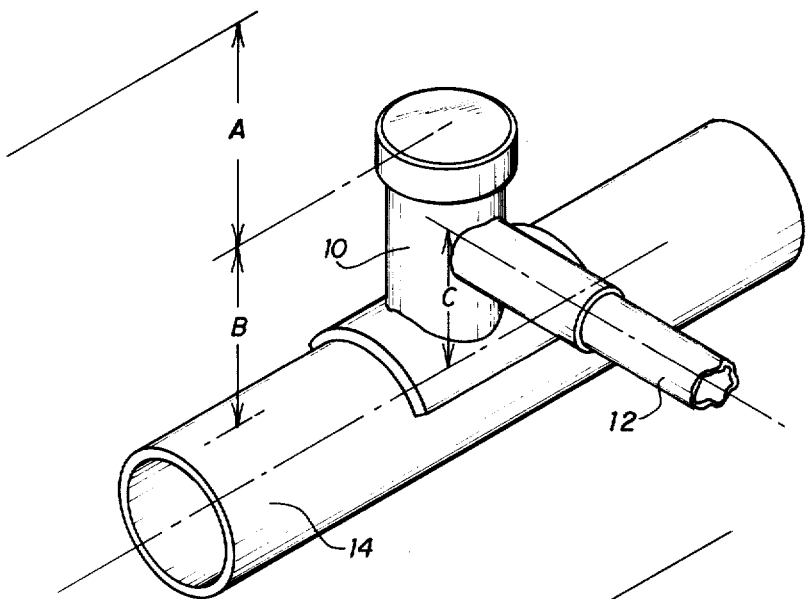
FIG. 1 is a perspective view of a conventional prior art apparatus for attaching a service line at right angle to a main and wherein the fitting extends vertically above the main.
Figure 2:
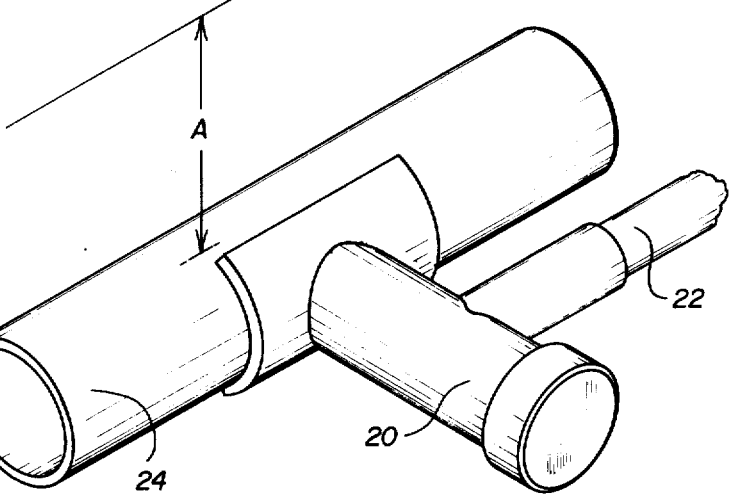
FIG. 2 is a perspective view of a second prior art device wherein a service line is connected to extend parallel to a gas main.

Turning now to the Drawings wherein like reference characters designate like or corresponding parts throughout the several views, there is illustrated in FIGS. 1 and 2, prior art devices which are similar to the present invention, but do not provide the improvement thereof.

In FIG. 1, a typical prior art apparatus 10 is illustrated connecting a service line 12 at right angles to a conventional gas main 14. As can be seen, this apparatus 10 extends a distance "B" above the upper surface of the gas main 14 and locates the service line 12 a distance "C" above the gas main 14. Similar devices can be found in the previously-mentioned patents, and especially in the Patent to Leopold et al, U.S. Pat. No. 3,460,553, issued Aug. 12, 1969, and the Patent to Floren, U.S. Pat. No. 3,307,435, issued Mar. 7, 1967. It is apparent that if it is required that the all-gas lines and fittings be buried a distance "A" below the surface of the ground, that the gas main 14 must be buried an additional distance "B" to allow for the upward extension of the apparatus 10. In some conditions such as when rock is present adjacent to the soil surface any additional depth at which the gas main must be buried can substantially increase the cost of installation.

A second example of a conventional connection device is illustrated in FIG. 2, wherein apparatus 20 is illustrated connecting a service line 22 to a gas main 24. Although this apparatus connects a service line to a main without extending above the main, the connection is not at a right angle. In addition, an installation trench of substantial width is required to provide clearance for installing the apparatus 20. In addition, service lines connected in this manner create additional head losses due to the increased number of bends in the flow path and tend not to be dimensionally and structurally stable for the same reason. Similar examples of this type of structure are disclosed in the Patents to Hulslander, U.S. Pat. No. 3,142,205, issued July 28, 1964, and Risley et al, U.S. Pat. No. 3,131,712, issued May 5, 1964.

Figure 3:
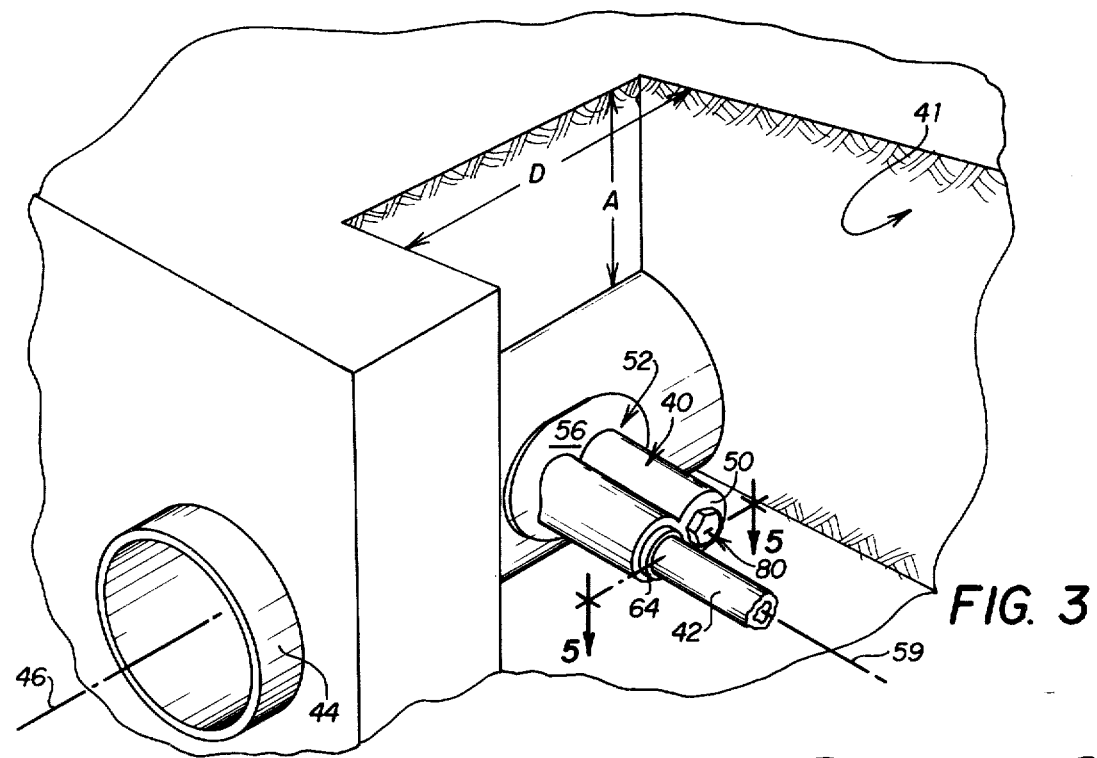
FIG. 3 is a perspective view of the improved apparatus of the present invention shown attaching a service line at right angle to a gas main buried in the ground.

Therefore, according to the present invention, an improved apparatus 40 for connecting a service conduit at a right angle to a gas main is illustrated in FIG. 3. This apparatus 40 is illustrated in a trench 41 attaching a service conduit 42 at right angles to a gas main conduit 44. The service conduit 42 normally is connected to a residence or the like, while the conduit 44 is connected to a source of gas.

This invention provides substantial advantages over the prior art by providing a right angle connection to the service main without any upward extension of the apparatus 40. Thus, the gas main can be buried in the soil at the minimum required depth "A" as illustrated in FIG. 1. In addition, due to the unique improved features of the invention, the width "D" of the access trench necessary for connecting the service conduit 42 is maintained at a minimum. Also, the connection is made while minimizing the number of bends in the flow path.

Figure 4:
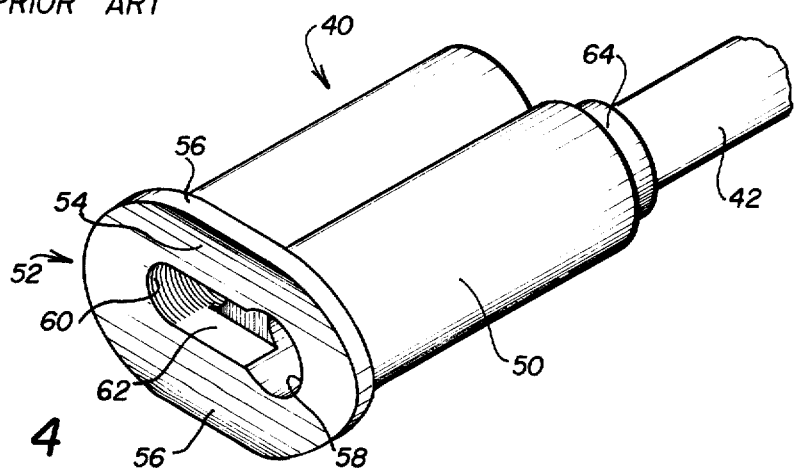
FIG. 4 is a perspective view of the apparatus of FIG. 3, showing the end which is fixed on the main.

By referring to FIGS. 3, 4 and 5, the improved apparatus 40 of the present invention will be described in detail. The apparatus 40 has a rigid fitting 50. This fitting 50 is elongated in shape and has a generally figure-eight-shaped cross section. The fitting can be formed from any material suitable for fixing to the exterior wall of the main 44. Typical materials are plastics such as polyethylene, to allow welding to a main 44 and service line 42 of like material. It is to be understood that other materials could be used.

The fitting 50 has an end 52 which is constructed to conform with and attach to the exterior of the gas main 44. This end 52 has a concave cylindrical surface 54 which extends onto an arcuate flange 56 on the fitting 50. Concave surface 54 conforms with the wall of the gas main 44. This conforming surface 54 facilitates welding and sealing of the fitting 50 to the exterior of the gas main 44, as will be hereinafter described in detail.

It is to be understood, of course, that even though the flange 56 adds substantially to the strength of the fitting 50 that the end 52 could be formed without the flange.

As illustrated in FIG. 3, the fitting 50 is adapted to be mounted in a horizontally-extending position on the exterior of the gas main 44. Typical methods of attaching include plastic welding, and the like.

The fitting 50 has a pair of spaced parallel through bores 58 and 60 extending the length of the fitting. These through bores are positioned to extend radially from the surface 54 and the center of main 44 when the fitting 50 is properly fixed thereon. These bores 58 and 60 are positioned with their center lines intersecting the center line 46 of the main 44. A port 62 interconnects bores 58 and 60 at a point adjacent the end 52. This connection provides flow communication between through bores 58 and 60.

Figure 5:
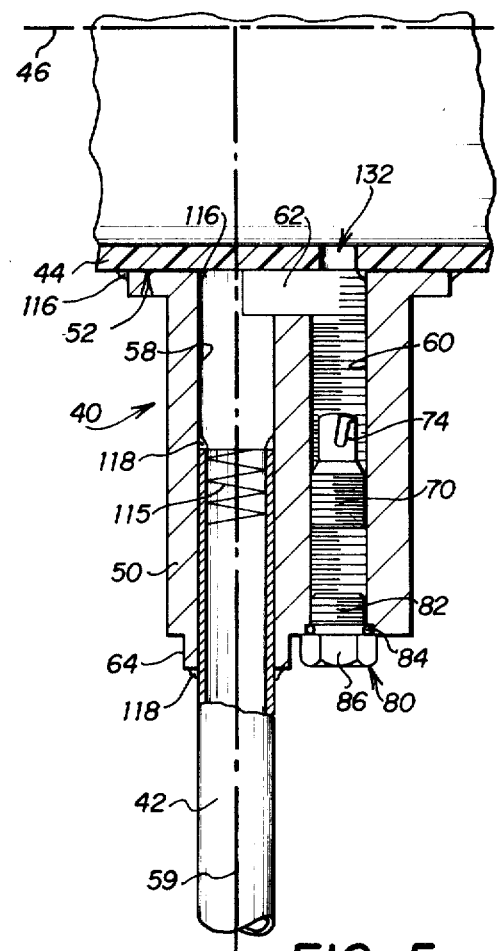
FIG. 5 is a section view of the improved apparatus of the present invention taken on line 5—5 of FIG. 3, looking in the direction of the arrows.
Figure 8:
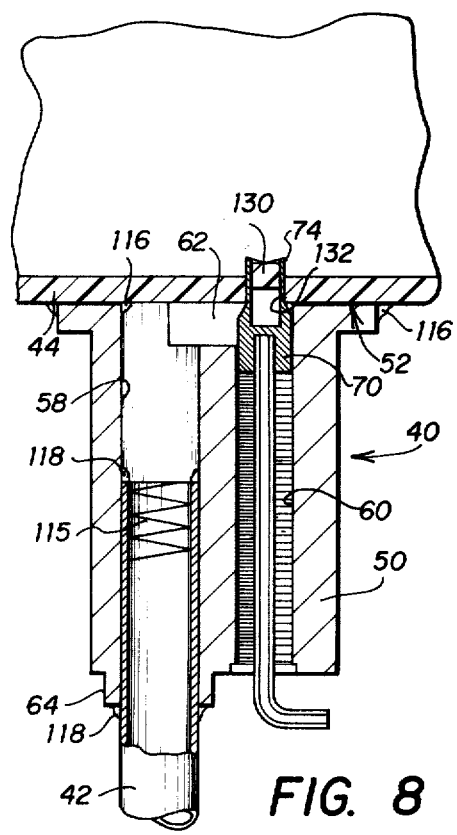
FIG. 8 is a view similar to FIG. 7 illustrating the tap axially reciprocated to a point of cutting through the wall of the gas main.

Through bore 58 is of a size and shape to be adapted to receive the service conduit 42 therein, as shown in FIG. 5. An annular flange 64 is provided on the end opposite end 52 around the opening of the bore 58. This flange 64 fits around the exterior of the service conduit 42.

The through bore 60 is internally threaded along its length for receiving an externally-threaded cutter 70. The external threads on the cutter 70 are selected to mate with the internal threads in the bore 60. Rotation of cutter 70 will cause the cutter 70 to axially translate along the bore 60.

The cutter 70 has a hexagonal socket 72 for engaging a tool. A cutting edge 74 is provided on the cutter on the opposite end from the socket 72. For purposes of the present invention, the particular shape and type of cutting edge 74 on the cutter 70 is not material. The cutter 70 can be of any prior art device which is well known in the art for tapping a hole in the side of a gas main. It is desirable, although not essential, that the cutter 70 be of a type which when tapping a hole, retains the removed coupon in the cutter to prevent it from entering the gas main 14 or service line 12.

A plug 80 can be provied for sealing the exterior end of the through bore 60. The plug 80 can be of any of a plurality of conventional designs. In the present invention, the plug 80 is provided with a threaded portion 82 which is of a size to engage the threads of the through bore 60. An O-ring seal 84 is provided for sealing between the plug 80 and the walls of the through bore 60. An annular sealing groove can be provided at the exterior end of the through bore 60 to accommodate the O-ring seal 84. A hexagonal head 86 can be provided on the plug 80 for screwing the plug into and out of the through bore 60.

INSTALLATION PROCEDURE

The features and advantages of the present invention can best be appreciated through an understanding of the installation procedure for the improved apparatus 40 of the present invention to provide a right angle service connection to a gas main. The description of the installation will be made by referring particularly to FIGS. 3 and 5 through 10.

Figure 6:
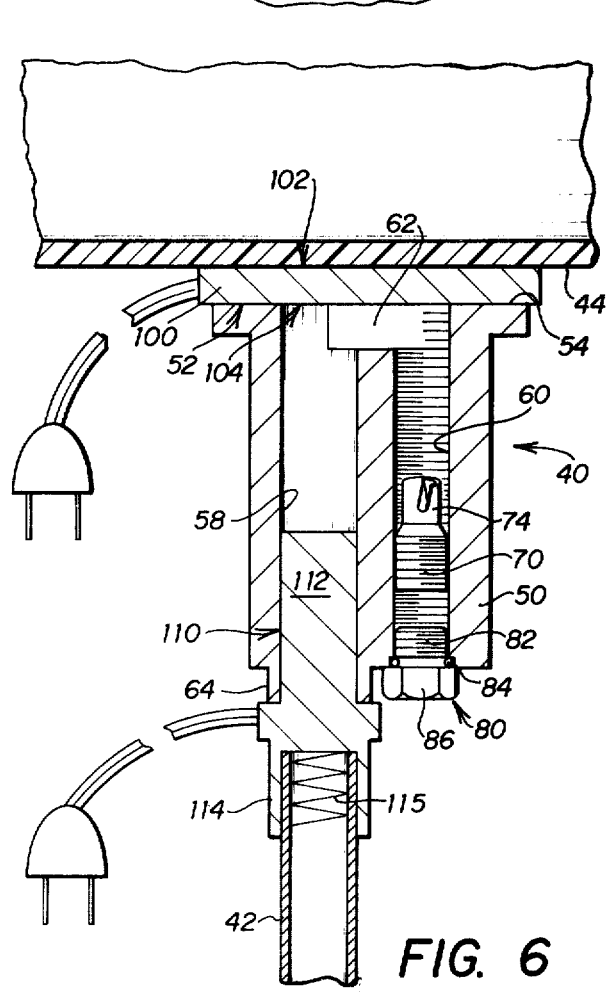
FIG. 6 is a view similar to FIG. 5 with the improved apparatus of the present invention shown being heated prior to connection to a gas main and a service line.

The first step in installing the improved apparatus 40 of the present invention is the excavation of an access trench 41 to the main 44 as shown in FIG. 3. Next, the fitting 50 with the cutter 70 and plug 80 installed therein is prepared for installation. The end 52 is placed adjacent to a conventional heater assembly 100, as shown in FIG. 6. This heater 100 is provided with concave surface 102 and a convex surface 104. The concave surface 102 conforms with the cylindrical exterior of the main 44 while the convex surface 104 conforms with the surface 54 on end 52 of the fitting 50. The heater is a conventional design, and is provided with a plurality of electrical heating coils which, when activated, will heat the surface of the end 52 and the exterior of the main 44. This process is continued until the plastic material forming the main and the fitting 50 is softened such that when the heater is removed and the fitting 50 is pressed against the exterior of the main 44, the two will be welded together. It is important to note that the fitting 50 is positioned so that the center line 59 of bore 58 extends horizontally from the side of the main 44. This center line 59 is positioned to intersect the center line 46 of main 44 at a right angle.

Figure 7:
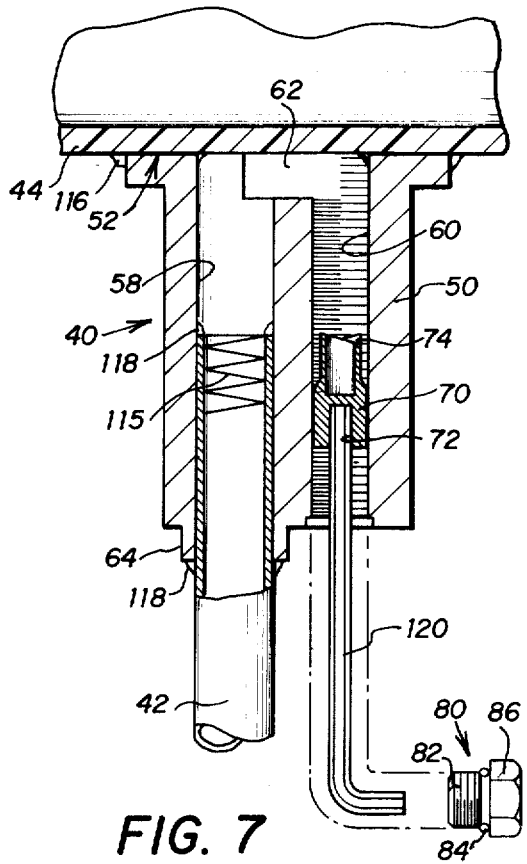
FIG. 7 is a view similar to FIG. 5, showing the improved apparatus of the present invention fixed on a gas main with the service line connected thereto.

In a conventional manner, a heater assembly 110 is provided with a male portion 112 extending into through bore 58 and a female portion 114 of a size to receive the end of the service conduit 42 therein. A stiffener 115 can be placed in the service conduit 42 to prevent collapse during the heating process. The interior of the through bore 58 and exterior of the conduit 42 are heated such that when the heater 110 is removed and the conduit 42 inserted within the through bore 58, the conduit 42 will fuse with the material of the fitting 50 to weld the two together and provide a positive seal therebetween. This configuration is illustrated in FIG. 7 with the weld 116 illustrated attaching and sealing the end 52 onto the exterior of the gas main 44 and the welds 118 attaching and sealing the service conduit 42 to the fitting 50. Thus, the service conduit 42 is attached to the fitting 50 which is in turn fixed and sealed on the exterior of the main 44.

Figure 9:
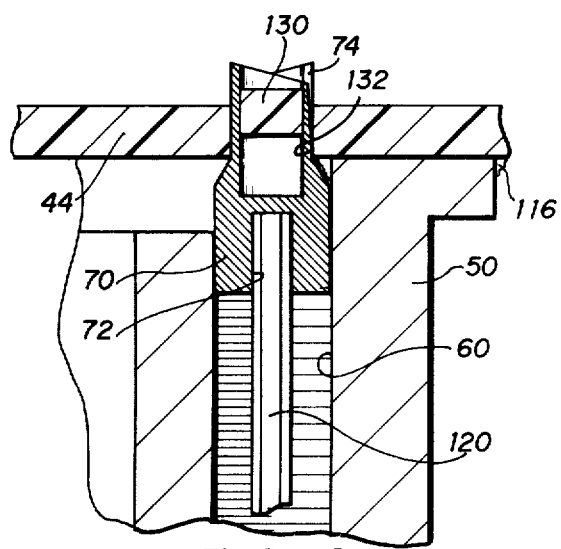
Fig. 9 is an emploded view of a portion of the section of FIG. 8 showing a coupon removed from the wall of the gas main.

Once the fitting is welded to main 44 and conduit 42, plug 80 is removed by engaging the head 86 with a suitable wrench and rotating the same to remove it from the bore 60. With the plug removed, as illustrated in FIG. 7, an Allen wrench 120, socket wrench, or the like, can be used to engage the socket 72 of the cutter 70 as shown. The cutter 70 then can be rotated by the tool 120 to cause the cutter to axially translate in a direction toward the exterior wall of the gas main 44. The cutter 70 is manipulated until the cutting edge 74 engages the wall of the gas main 44 and removes a circular coupon 130 from the wall thereof. This is best illustrated in FIG. 9, wherein the coupon 130 is shown cut from the wall of the gas main 44 and retained within the interior of the cutting edge 74 of the cutter 70.

Figure 10:
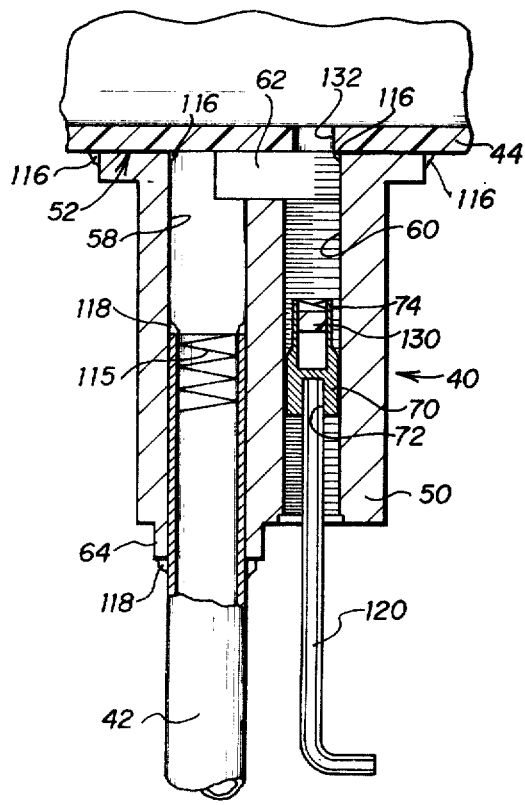
FIG. 10 is a view similar to FIG. 7 illustrating the improved apparatus of the present invention with the tap retracted from the main.

Upon completion of the cutting of the coupon 130 from the wall of the gas main 44, the direction of rotation of the cutter 70 can be reversed to back the cutter off to the position illustrated in FIG. 10. The tool 120 can be removed and plug 80 installed as illustrated in FIG. 5 to seal the open end of the through bore 60.

It is important to note that the removal of the coupon 130 from the wall of the gas main port 44 forms a port 132 in the wall of the gas main 44 which allows the gas to flow to the service conduit 43 by way of through bore 60, port 62, and through bore 58. Thus, a right angle connection is made in a gas main without interrupting the service and with a minimal size trench 41.

It is apparent that the present invention could be used to make right angle service connection to other than gas mains.

It should be understood, of course, that the foregoing disclosure relates only to the preferred embodiments of the invention, and that numerous modifications or alterations may be made therein by those of ordinary skill in the art without departing from the spirit and scope of the invention as defined in the appended claims.

I claim:

1. An apparatus for connecting a service line at a right angle to a cylindrical main, comprising a fitting having a concave mounting surface formed on one end thereof, said mounting surface conforming with the exterior surface of said main, first and second parallel spaced through bores extending from said mounting surface through the length of said fitting to the opposite end thereof, said first and second bores having their center lines in a plane with the center line of said concave surface and with the center lines of said bores extending at right angles to the center line of said concave surface; means in said fitting interconnecting said first and second bores, means for connecting a service line in said first bore to extend axially from said first bore, and means in said second bore for receiving a means for forming a port in said main.

2. The apparatus of claim 1 additionally comprising a sealing plug for sealing the open end of said second bore.

3. The apparatus of claim 1 additionally comprising a flange formed on said fitting adjacent said mounting surface.

4. The apparatus of claim 1 additionally comprising internal threads formed in said second bore.

5. The apparatus of claim 4 additionally comprising a port forming means which comprises an externally threaded member, a cutting edge on one end of said member for contacting and cutting the wall of said main, and means on the other end of said member for engaging and rotating said member in said second bore.

6. An apparatus connecting a service line at a right angle to a main, comprising in combination:
   a. a fitting having one end attached to the outside of said main to extend in a first direction therefrom, said fitting having first and second parallel spaced through bores, each of said through bores being positioned so that their center line extends at a right angle to and intersects the center line of said main, means in said fitting interconnecting said first and second through bores; said first through bore having a service line connected there in and extending axially therefrom, and
   b. means in said second through bore for forming a port in said main to interconnect said main and said service line.

7. The apparatus of claim 6 additionally comprising a sealing plug for sealing the open end of said second bore.

8. The apparatus of claim 6 additionally comprising a flange formed on said fitting adjacent said one end.

9. The apparatus of claim 6 additionally comprising internal threads formed in said second bore.

10. The apparatus of claim 9 wherein said port forming means comprises an externally threaded member, a cutting edge on one end of said member for contacting and cutting the wall of said main, and means on the other end of said member for engaging and rotating said member in said second bore.

11. A fitting for use in connecting a service line at right angle to a main, comprising:
a rigid body,
concave arcuate surface means formed on one end of said body for attaching said body to the wall of a main,
a pair of parallel spaced through bores in said body extending radially from said surface means, one of said bores being of a size for connecting said service line therein,
means in said body interconnecting said bores, and
internal threads formed in one of said bores.

12. An apparatus connecting a service line at right angle to a plastic main comprising in combination:

a. a fitting of plastic material, a flange on one end of said fitting defining a concave mounting surface fused onto the exterior surface on said main, said fitting having first and second parallel spaced through bores extending from said mounting surface through the length of said fitting to the opposite end thereof, said first and second through bores extending in a direction having their center lines intersecting the center line of said main at a right angle, a passageway in said fitting interconnecting said first and second through bores, said service line being fused into said first through bore to extend axially therefrom, internal threads formed in said second through bore;

b. a port forming means in said second through bore for forming a port in said main to interconnect said main and said service line, said port forming means comprises an externally threaded member engaging the internal threads in said second through bore, a cutting edge on one end of said member for contacting and cutting a circular coupon from the wall of said main, and socket means on the other end of said member for rotating said member by means of a tool; and c. an externally threaded sealing plug removably attached to said second bore and engaging the threads in said second bore to seal the open end of said second bore.

* * * * *

UNITED STATES PATENT OFFICE
CERTIFICATE OF CORRECTION

Patent No. 3,937,245　　　　　　　　　Dated February 10, 1976

Inventor(s) Joe William Christie

It is certified that error appears in the above-identified patent and that said Letters Patent are hereby corrected as shown below:

Col. 6, line 10, after "conduit", change "43" to --42--.

Signed and Sealed this

Eighteenth Day of January 1977

[SEAL]

Attest:

RUTH C. MASON
*Attesting Officer*

C. MARSHALL DANN
*Commissioner of Patents and Trademarks*